US012744393B2

(12) United States Patent
Nakamura et al.

(10) Patent No.: US 12,744,393 B2
(45) Date of Patent: Sep. 22, 2026

(54) CHARGING SYSTEM

(71) Applicant: TOYOTA JIDOSHA KABUSHIKI KAISHA, Toyota (JP)

(72) Inventors: Ikuhiro Nakamura, Nisshin (JP); Keisuke Sawazaki, Nisshin (JP); Toshio Ikeyama, Toyota (JP); Takuya Isomura, Aichi-gun (JP); Koichi Kuwahara, Nagoya (JP); Tatsuya Furukawa, Nisshin (JP); Takashi Kohyama, Toyota (JP); Yohichi Murasawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/967,985

(22) Filed: Dec. 4, 2024

(65) Prior Publication Data

US 2025/0233443 A1 Jul. 17, 2025

(30) Foreign Application Priority Data

Jan. 12, 2024 (JP) ................................ 2024-003442

(51) Int. Cl.
*H02J 7/24* (2006.01)
*H02K 3/04* (2006.01)

(52) U.S. Cl.
CPC ............. *H02J 7/24* (2013.01); *H02J 2207/20* (2020.01); *H02K 3/04* (2013.01)

(58) Field of Classification Search
CPC ............ H02J 7/24; H02J 2207/20; H02J 7/02; H02J 7/14; H02J 7/751; H02K 3/04; H02K 9/16; B60L 2220/54; B60L 53/22; B60L 53/24; B60L 50/51; H02M 1/08; H02M 7/48; H02P 27/06; B60Y 2200/91; Y02T 10/70; Y02T 10/7072
See application file for complete search history.

(56) References Cited

U.S. PATENT DOCUMENTS 5,642,270 A * 6/1997 Green ..................... B60L 53/11 363/17
11,545,923 B2 1/2023 Choi et al.
2021/0380005 A1* 12/2021 Bin ......................... B60L 53/24
(Continued)

FOREIGN PATENT DOCUMENTS

DE 41 07 391 A1 9/1992
JP 2022-112505 A 8/2022
JP 2023-114972 A 8/2023

*Primary Examiner* — Rexford N Barnie
*Assistant Examiner* — Terrence R Willoughby
(74) *Attorney, Agent, or Firm* — Sughrue Mion, PLLC

(57) ABSTRACT

A charging system includes: an inverter including a direct current positive end, a direct current negative end, and alternating current ends, the direct current positive end and the direct current negative end being connected to a battery; a motor including N stator coils each having a first end connected to a corresponding one of the alternating current ends and a second end connected to a neutral point; a power receiving terminal including a power receiving positive end and a power receiving negative end, the power receiving negative end being connected to a battery negative end of the battery; and a charging switch configured to connect the first end of each of one or more and less than N of the stator coils to the power receiving positive end.

6 Claims, 4 Drawing Sheets

(56) References Cited

U.S. PATENT DOCUMENTS

| | | | | |
|---|---|---|---|---|
| 2022/0169147 | A1* | 6/2022 | Huang | B60L 58/27 |
| 2022/0216714 | A1 | 7/2022 | Zhang et al. | |
| 2022/0324340 | A1 | 10/2022 | Haghbin | |
| 2023/0087317 | A1* | 3/2023 | Kim | B60L 53/24<br>701/31.7 |
| 2023/0249566 | A1 | 8/2023 | Kim et al. | |
| 2023/0253818 | A1* | 8/2023 | Bin | H02J 7/1446<br>320/104 |
| 2025/0033498 | A1* | 1/2025 | Jang | B60L 53/20 |
| 2026/0074316 | A1* | 3/2026 | Wu | B60L 53/24 |
| 2026/0074317 | A1* | 3/2026 | Wu | H01M 10/615 |

* cited by examiner

CHARGING SYSTEM

CROSS-REFERENCE TO RELATED APPLICATION

This application claims priority to Japanese Patent Application No. 2024-003442 filed on Jan. 12, 2024, incorporated herein by reference in its entirety.

BACKGROUND

1. Technical Field

The technique disclosed in the present disclosure relates to charging systems that include an inverter and a motor and that are configured to charge a battery by using switching elements of the inverter and stator coils of the motor as a boost circuit.

2. Description of Related Art

A circuit composed of stator coils of a motor and switching elements of an inverter is known to be used as a boost converter. Japanese Unexamined Patent Application Publication No. 2023-114972 (JP 2023-114972 A) discloses a device that charges a battery by a power supply having a lower output voltage than the battery by using stator coils of a motor and lower switching elements of an inverter as a boost circuit.

When charging a battery by the device of JP 2023-114972 A, a power supply is connected to a neutral point to which a plurality of stator coils is connected. The current of the power supply flows through the neutral point to the stator coils. The voltage of the power supply is boosted by the stator coils by turning on and off lower switching elements of a first inverter. The electric power from the power supply flows through the neutral point, the stator coils, and the first inverter to the battery.

SUMMARY

Electrical characteristics of stator coils are determined based on the performance required of a motor. Therefore, the electrical characteristics of the stator coils are not always optimal for a boost circuit. The inductance of the stator coils of the motor is lower than the inductance required of a reactor of the boost circuit. If the boost circuit has low inductance, alternating current (AC) loss increases. The present disclosure provides a technique for increasing the inductance of a boost circuit that uses stator coils by effectively using a plurality of stator coils.

A charging system according to a first aspect of the present disclosure is a charging system that boosts a voltage of a power supply to charge a battery. The charging system includes: an inverter including a direct current positive end, a direct current negative end, and a plurality of alternating current ends, the direct current positive end and the direct current negative end being connected to the battery; a motor including N stator coils each having a first end connected to a corresponding one of the alternating current ends and a second end connected to a neutral point, wherein N is the number of stator coils; a power receiving terminal including a power receiving positive end and a power receiving negative end that are configured to be connected to the power supply, the power receiving negative end being connected to a battery negative end of the battery; and a charging switch configured to connect the first end of each of one or more and less than N of the stator coils to the power receiving positive end.

For convenience of description, the stator coil connected to the charging switch will be referred to as "upstream stator coil", and the remainder of the stator coils will be referred to as "downstream stator coil". With the above structure, the upstream stator coil and the downstream stator coil are connected in series in a current path from the power supply to the battery. When the coils are connected in series, the total inductance increases. When charging the battery with power from the power supply, the inductance of a reactor (i.e., the series connections of the upstream stator coil and the downstream stator coil) becomes high. This reduces loss (AC loss) during voltage boosting.

The charging system according to the first aspect of the present disclosure may further include a cooler configured to cool the stator coil with a liquid cooling medium. The charging switch may be configured to connect the first end of one of the stator coils to the power receiving positive end. The stator coil connected to the charging switch may be located below the remainder of the stator coils in a vertical direction.

The charging system according to the first aspect of the present disclosure may further include a direct charging switch configured to connect the power receiving positive end to a battery positive end by bypassing the stator coils.

The charging system according to the first aspect of the present disclosure may further include a sub-inverter whose direct current ends are connected to the battery and whose alternating current ends are connected to the second ends of the stator coils.

Details and further improvements of the technique disclosed in the present disclosure will be described in "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
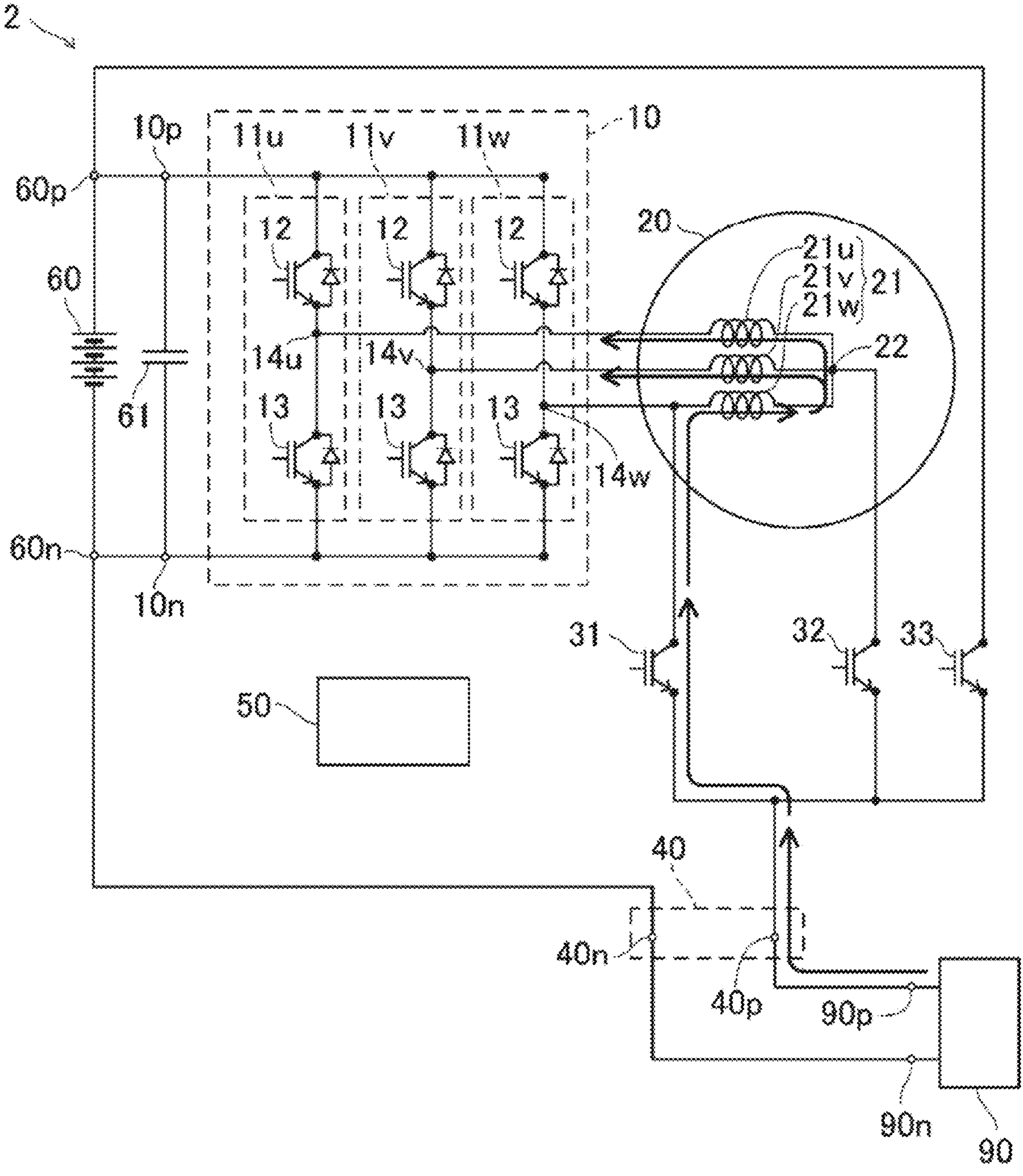
FIG. 1 is a circuit diagram of a charging system according to a first embodiment.

Charging systems according to embodiments will be described with reference to the drawings. FIG. 1 is a circuit diagram of a charging system 2 according to a first embodiment. The charging system 2 includes an inverter 10, a motor 20, a first charging switch 31, a second charging switch 32, a direct charging switch 33, a power receiving terminal 40, and a controller 50. The controller 50 controls each switching element and each switch. Signal lines between the controller 50 and each switching element and each switch are not shown in the figure. FIG. 1 illustrates a battery 60 and an external power supply 90 in addition to the charging system 2. The external power supply 90 can be connected to and disconnected from the power receiving terminal 40. An inverter 10 includes a direct current (DC) positive end 10*p*, a DC negative end 10*n*, and N alternating current (AC) ends (N>1).

The charging system 2 will now be generally described. The charging system 2 can charge the battery 60 by the external power supply 90 connected to the power receiving terminal 40. When charging the battery 60, a combination of lower switching elements 13 of the inverter 10 and stator coils 21 of the motor 20 functions as a boost circuit. Therefore, the charging system 2 can charge the battery 60 by the external power supply 90 having a lower output voltage than the battery 60.

The charging system 2 and the battery 60 are mounted on a battery electric vehicle. The motor 20 is connected to an axle (not shown) of the battery electric vehicle, and the charging system 2 also functions as a drive system that drives the motor 20 with electric power from the battery 60 to move the battery electric vehicle.

The motor 20 is a three-phase AC motor and includes three stator coils 21 (U-phase stator coil 21*u*, V-phase stator coil 21*v*, and W-phase stator coil 21*w*). One ends (first ends) of the three stator coils 21 are connected to AC ends of the inverter 10. The other ends (second ends) of the three stator coils 21 are connected to a neutral point 22. The charging system 2 can drive the motor 20 only when the external power supply 90 is not connected to the power receiving terminal 40. Next, the charging system 2 will be described in detail.

The configuration of the inverter 10 will be described. A positive end of a battery 60 (battery positive end 60*p*) is connected to the DC positive end 10*p* of the inverter 10, and a negative end of the battery 60 (battery negative end 60*n*) is connected to the DC negative end 10*n*. The one ends of the three stator coils 21 are connected to the three AC ends. In FIG. 1, the left end of each stator coil 21 corresponds to the one end, and the right end of each stator coil 21 corresponds to the other end.

The inverter 10 includes three series connections 11*u*, 11*v*, and 11*w*. The three series connections 11*u*, 11*v*, and 11*w* are connected in parallel between the DC positive end 10*p* and the DC negative end 10*n*.

Each of the three series connections 11*u*, 11*v*, and 11*w* includes an upper switching element 12 and a lower switching element 13 that are connected in series. The upper switching elements 12 are connected to the DC positive end 10*p*, and the lower switching elements 13 are connected to the DC negative end 10*n*. Midpoints 14*u*, 14*v*, and 14*w* of the three series connections 11*u*, 11*v*, and 11*w* are the AC ends of the inverter 10. Hereinafter, the midpoints 14*u*, 14*v*, and 14*w* are sometimes referred to as "AC ends 14*u*, 14*v*, and 14*w*". The one ends of the three stator coils 21*u*, 21*v*, and 21*w* are connected to the three AC ends 14*u*, 14*v*, and 14*w*, respectively.

Freewheeling diodes are connected in inverse parallel to the switching elements of the inverter 10. Each of the freewheeling diodes may be an element separate from the switching element, or may be a diode element contained in the switching element.

When the controller 50 alternately turns on and off the upper switching elements 12 and the lower switching elements 13, an AC current is output from the AC ends 14*u*, 14*v*, and 14*w*.

The charging system 2 includes the power receiving terminal 40. The power receiving terminal 40 includes a power receiving positive end 40*p* to which a positive end 90*p* of the external power supply 90 is connected, and a power receiving negative end 40*n* to which a negative end 90*n* of the external power supply 90 is connected. The power receiving negative end 40*n* is connected to the battery negative end 60*n*.

The charging system 2 includes the first charging switch 31, the second charging switch 32, and the direct charging switch 33. The first charging switch 31 connects the power receiving positive end 40*p* to the one end of one stator coil (W-phase stator coil 21*w*). In other words, the first charging switch 31 connects the power receiving positive end 40*p* to the AC end 14*w*. The second charging switch 32 connects the power receiving positive end 40*p* to the neutral point 22. The direct charging switch 33 connects the power receiving positive end 40*p* to the battery positive end 60*p* by bypassing the stator coils 21.

As described above, the charging system 2 also functions as a drive system that drives the motor 20 with the electric power from the battery 60. When driving the motor 20, the controller 50 opens the first charging switch 31, the second charging switch 32, and the direct charging switch 33. The controller 50 then alternately turns on and off the upper and lower switching elements 12, 13 of the inverter 10. An AC current is supplied from the AC ends 14*u*, 14*v*, and 14*w* of the inverter 10 to the stator coils 21, causing the motor 20 to rotate.

A case where the battery 60 is charged by the external power supply 90 will be described. When the output voltage of the external power supply 90 is lower than the output voltage of the battery 60, the controller 50 closes the first charging switch 31 or the second charging switch 32.

A case where the controller 50 closes the second charging switch 32 and opens the first charging switch 31 and the direct charging switch 33 will be described. When the controller 50 closes the second charging switch 32, the positive end 90*p* of the external power supply 90 is connected to the neutral point 22. The positive end 90*p* of the external power supply 90 is connected to the battery positive end 60*p* via the second charging switch 32, the neutral point 22, the three stator coils 21*u*, 21*v*, and 21*w*, and the freewheel diodes of the upper switching elements 12.

The stator coils 21 and the lower switching elements 13 function as a boost circuit. When the controller 50 turns on and off the three lower switching elements 13 as appropriate, the output voltage of the external power supply 90 is boosted by the stator coils 21. The boosted power of the external power supply 90 is supplied to the battery 60 through the stator coils 21. Therefore, the charging system 2 can charge the battery 60 by the external power supply 90 having a lower output voltage than the battery 60. When the second charging switch 32 is closed, the three stator coils 21 are connected in parallel in the boost circuit.

A case where the controller 50 closes the first charging switch 31 and opens the second charging switch 32 and the direct charging switch 33 will be described. When the controller 50 closes the first charging switch 31, the positive end 90*p* of the external power supply 90 is connected to the one end of the W-phase stator coil 21*w*. The positive end 90*p* of the external power supply 90 is connected to the battery positive end 60*p* via the first charging switch 31, the W-phase stator coil 21*w*, the neutral point 22, the U-phase and V-phase stator coils 21*u*, 21*v*, and the inverter 10.

In this case, the W-phase stator coil 21*w* and the U-phase (V-phase) stator coil 21*u* (21*v*) are connected in series in the boost circuit. In FIG. 1, a current flow when the first charging switch 31 is closed is shown by thick arrow lines. A current from the external power supply 90 flows through the power receiving positive end 40*p* and the first charging switch 31 to the W-phase stator coil 21*w*. The current having passed through the W-phase stator coil 21*w* is divided into the U-phase stator coil 21*u* and the V-phase stator coil 21*v*.

When the controller 50 turns on and off the lower switching elements 13 of the U-phase and V-phase series connections 11*u*, 11*v* as appropriate, the output voltage of the external power supply 90 is boosted by series connection of the stator coils 21*w*, 21*u* and series connection of the stator coils 21*w*, 21*v*. The boosted power of the external power supply 90 is supplied to the battery 60 through the stator coils 21. In this case as well, the charging system 2 can charge the battery 60 by the external power supply 90 having a lower output voltage than the battery 60.

Advantages of charging using the first charging switch 31 will be described. Electrical characteristics (particularly the inductance) of the stator coils 21 of the motor 20 are not always suitable for a reactor of the boost circuit. Since the main function of the motor 20 is to output torque, the stator coils 21 have inductance suitable for outputting torque. It is desirable that the stator coils of the motor have low inductance in order to reduce a back electromotive force. On the other hand, it is preferable that the reactor of the boost circuit have high inductance. This is because the high inductance allows a large amount of magnetic energy to be stored in the reactor. If the reactor of the boost circuit has low inductance, current ripple becomes large and AC loss increases.

In the boost circuit using the first charging switch 31, the W-phase stator coil 21*w* and the V-phase stator coil 21*v* are connected in series. The W-phase stator coil 21*w* and the U-phase stator coil 21*u* are also connected in series. The total inductance when two coils are connected in series is higher than the total inductance when two coils are connected in parallel. Therefore, the inductance of the coils of the boost circuit using the first charging switch 31 is larger than the inductance of the boost circuit using the second charging switch 32 (in this case, the three stator coils 21 are connected in parallel). When the first charging switch 31 is used, the inductance of the reactor of the boost circuit becomes large, so that AC loss during charging is reduced.

In the charging system 2, two of the stator coils 21 provided in the motor 20 are connected in series. The charging system 2 can implement a boost circuit including series connections of a plurality of coils without adding a new coil.

In the charging system 2 of the first embodiment, each of the currents flowing through the stator coils 21*u*, 21*v* is half the current flowing through the stator coil 21*w*. Therefore, the amount of heat generation of the stator coil 21*w* is larger than each of the amounts of heat generation of the stator coils 21*u*, 21*v*. Therefore, in the charging system 2, the motor 20 is disposed in such a manner that the cooling performance for the stator coil 21*w* becomes higher than the cooling performance for the stator coils 21*u*, 21*v*.

Figure 2:
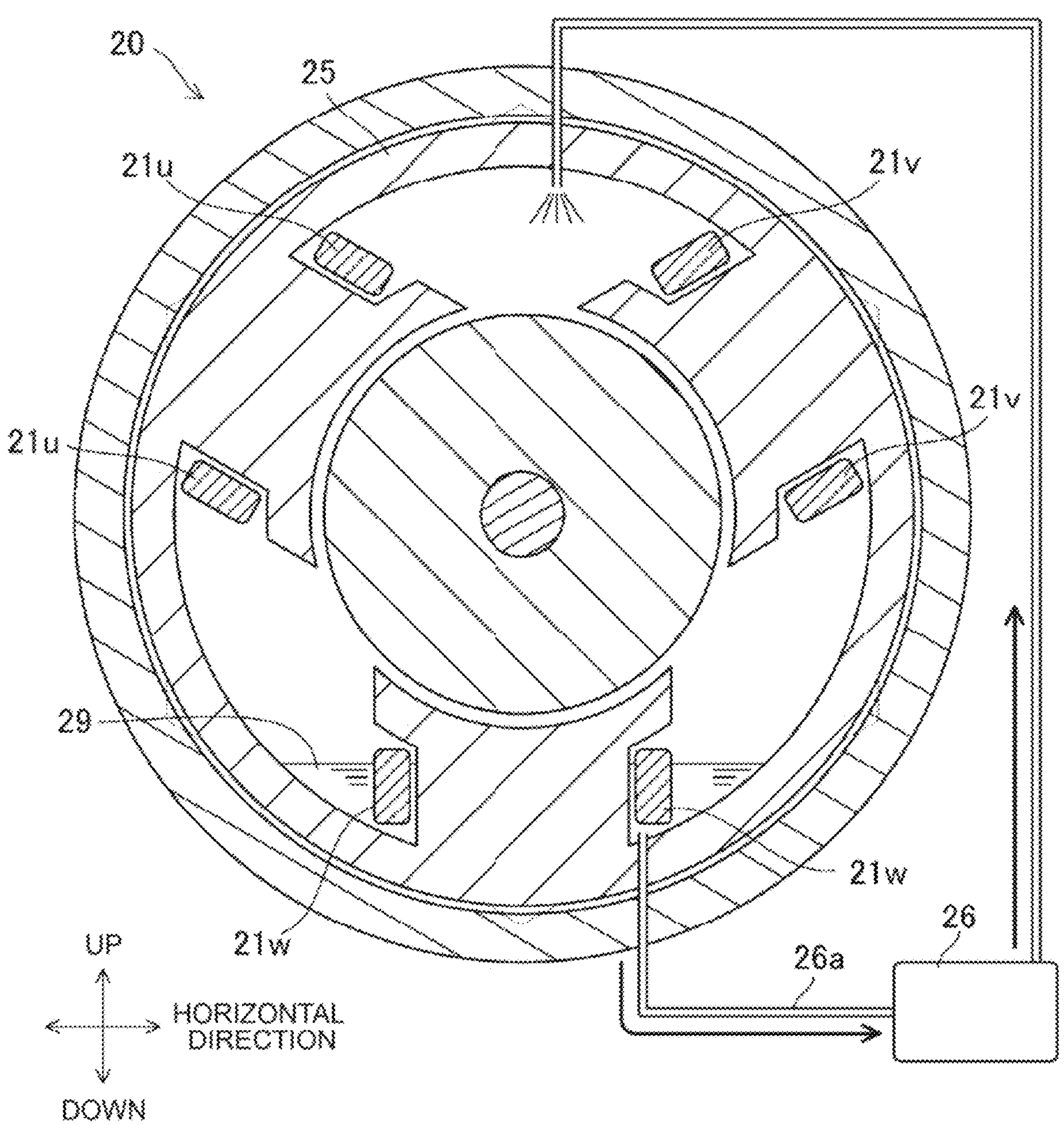
FIG. 2 is a sectional view of a motor included in the charging system.

FIG. 2 shows a longitudinal section of the motor 20. The motor 20 is disposed such that its axis coincides with the horizontal direction. In the motor 20, the W-phase stator coil 21*w* having its one end connected to the first charging switch 31 is located below the other stator coils 21*u*, 21*v* in the vertical direction.

The motor 20 of the charging system 2 is provided with a cooler 26. The cooler 26 cools the motor 20 using a liquid cooling medium. A channel 26*a* of the cooler 26 is connected to the upper and lower parts of a stator 25. The cooler 26 supplies the liquid cooling medium to the upper part of the stator 25. The liquid cooling medium 29 accumulates in the lower part of the stator 25. The cooler 26 sucks the cooling medium that has accumulated in the lower part of the stator 25 and returns it to the upper part of the stator 25. Thick arrow lines in FIG. 2 indicate the flow direction of the cooling medium. Since the W-phase stator coil 21*w* is disposed below the other stator coils 21*u*, 21*v*, the W-phase stator coil 21*w* is at least partially immersed in the liquid cooling medium 29 as shown in FIG. 2 and is strongly cooled. In the charging system 2, the W-phase stator coil 21*w* through which a large current flows is cooled more strongly than the other stator coils 21*u*, 21*v*.

Referring back to FIG. 1, the circuitry of the charging system 2 will further be described. When the output voltage of the external power supply 90 is equal to the output voltage of the battery 60, the controller 50 opens the first charging switch 31 and the second charging switch 32 and closes the direct charging switch 33. As shown in FIG. 1, the direct charging switch 33 connects the power receiving positive end 40*p* to the battery positive end 60*p* by bypassing the stator coils 21. In other words, when the direct charging switch 33 is closed, the current of the external power supply 90 bypasses the stator coils 21 and flows to the battery positive end 60*p*. When the output voltage of the external power supply 90 is equal to the output voltage of the battery 60, the charging system 2 can supply the current of the external power supply 90 to the battery 60 without through the stator coils 21. Bypassing the stator coils 21 can reduce loss during charging.

Second Embodiment

Figure 3:
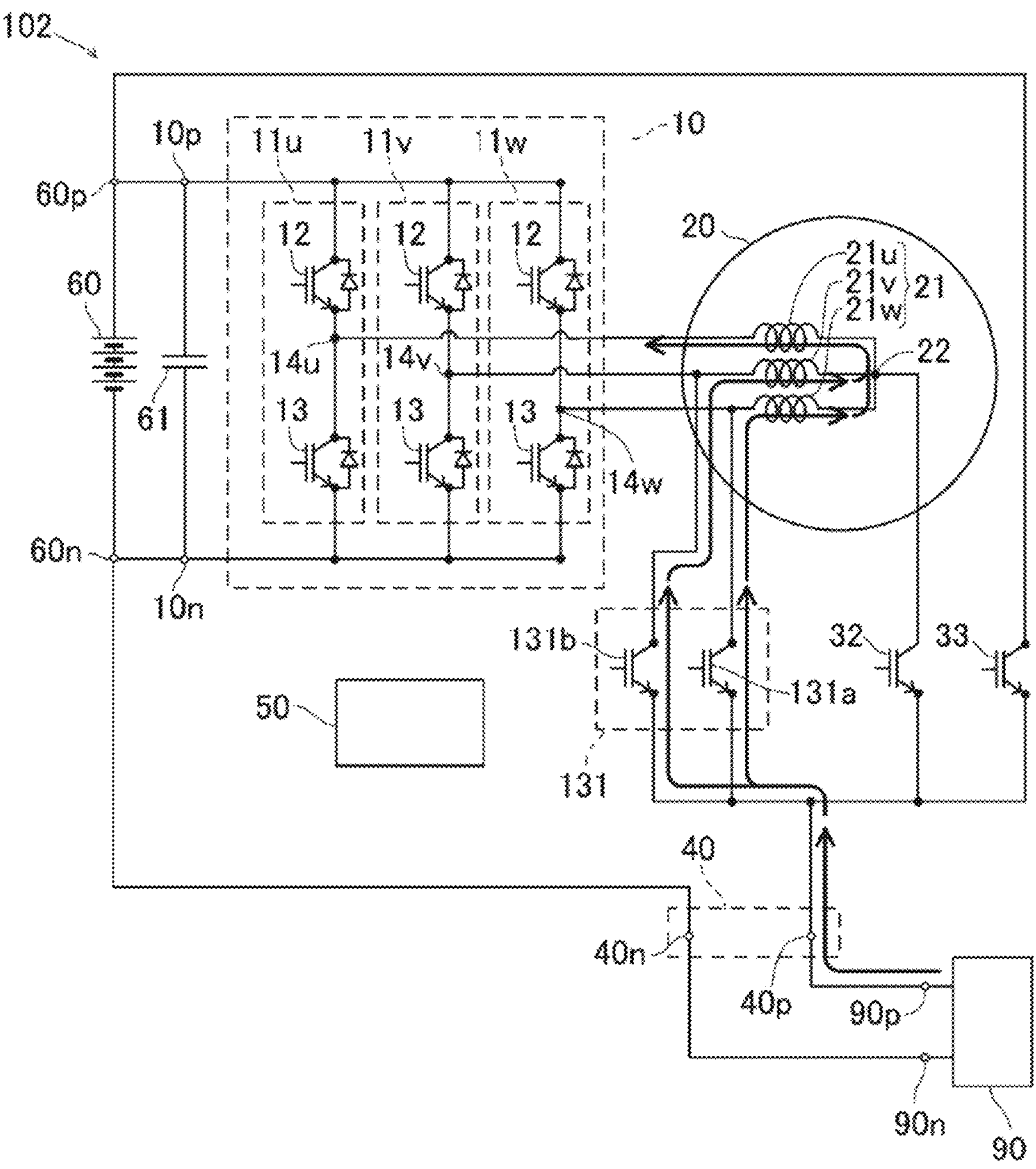
FIG. 3 is a circuit diagram of a charging system according to a second embodiment.

FIG. 3 is a circuit diagram of a charging system 102 according to a second embodiment. The charging system 102 includes a first charging switch 131 instead of the first charging switch 31 of the charging system 2. The configuration of the charging system 102 is the same as that of the charging system 2 except for the first charging switch 131.

The first charging switch 131 includes charging sub-switches 131*a*, 131*b*. The charging sub-switch 131*a* connects the one end of the W-phase stator coil 21*w* to the power receiving positive end 40*p*, and the charging sub-switch 131*b* connects the one end of the V-phase stator coil 21*v* to the power receiving positive end 40*p*. The controller 50 closes or opens the two charging sub-switches 131*a*, 131*b* at the same time.

Thick arrow lines in FIG. 3 indicate a current flow when the first charging switch 131 is closed. In the charging system 102, a parallel connection of the stator coils 21*w*, 21*v* is connected in series with the U-phase stator coil 21*u*. The currents flowing through the stator coils 21*w*, 21*v* merge and flow through the stator coil 21*u*. Therefore, the inductance of the boost circuit when the first charging switch 131 is closed larger than the inductance of the boost circuit when the second charging switch 32 is closed (total inductance when the three stator coils 21 are connected in parallel). Like the charging system 2, the charging system 102 can reduce AC loss in the boost circuit using the lower switching elements 13 and the stator coils 21.

Third Embodiment

Figure 4:
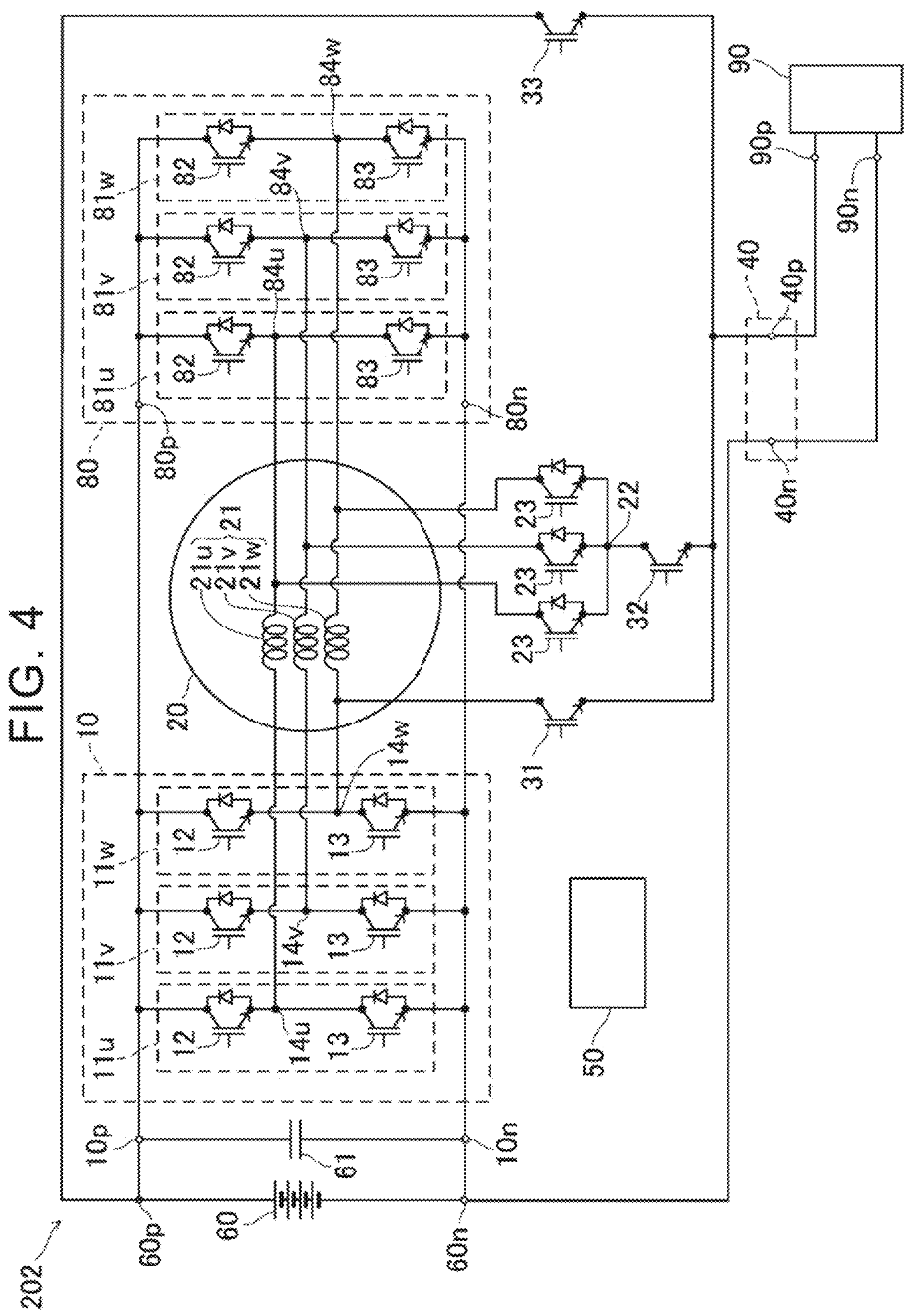
FIG. 4 is a circuit diagram of a charging system according to a third embodiment.

FIG. 4 is a circuit diagram of a charging system 202 according to a third embodiment. The charging system 202 is obtained by adding a sub-inverter 80 and a plurality of neutral point switching elements 23 to the charging system 2. DC ends of the sub-inverter 80 are connected to the battery 60. A DC positive end 80*p* of the sub-inverter 80 is connected to the battery positive end 60*p*, and a DC negative end 80*n* of the sub-inverter 80 is connected to the battery negative end 60*n*. The sub-inverter 80 includes three AC ends 84*u*, 84*v*, and 84*w*. The AC ends 84*u*, 84*v*, and 84*w* are connected to the other ends of the three stator coils 21*u*, 21*v*, and 21*w*, respectively.

The sub-inverter 80 includes three series connections 81*u*, 81*v*, and 81*w*. In each of the three series connections 81*u*, 81*v*, and 81*w*, an upper switching element 82 and a lower switching element 83 are connected in series. In each of the series connections 81*u*, 81*v*, and 81*w*, a midpoint 84*u* (84*v*, 84*w*) between the upper switching element 82 and the lower switching element 83 is the AC end of the sub-inverter 80. The circuit configuration of the sub-inverter 80 is the same as the circuit configuration of the inverter 10.

Each of the neutral point switching elements 23 is connected between the other end of a corresponding one of the stator coils 21 and the neutral point 22. When all of the neutral point switching elements 23 are closed, the other ends of the stator coils 21 are connected to the neutral point 22. When all of the neutral point switching elements 23 are opened, the other ends of the stator coils 21 are electrically disconnected from the neutral point 22.

When the external power supply 90 is not connected, the inverters 10, 80 and the motor 20 serve as a dual inverter drive device when the controller 50 opens all of the neutral point switching elements 23. In the dual inverter, the one ends of the stator coils 21 are connected to the AC ends of the inverter 10, and the other ends of the stator coils 21 are connected to the AC ends of the sub-inverter 80.

When the controller 50 turns on and off the upper and lower switching elements of the inverter 10 and sub-inverter 80 as appropriate, the motor 20 outputs torque. When the motor 20 is driven with the two inverters 10, 80, the motor 20 can output higher torque than when the motor 20 is driven with a single inverter.

When charging the battery 60, the external power supply 90 is connected to the power receiving terminal 40. When connecting the three stator coils 21 in parallel to charge the battery 60, the controller 50 closes all of the neutral point switching elements 23 to connect the three stator coils 21 to the neutral point 22. The controller 50 closes the second charging switch 32 and opens the first charging switch 31 and the direct charging switch 33. The controller 50 opens all of the switching elements of the sub-inverter 80, and turns on and off the lower switching elements 13 of the inverter 10 as appropriate. As in the charging system 2 of the first embodiment, the voltage of the external power supply 90 is boosted and the battery 60 is charged.

When connecting part of the three stator coils 21 in series to charge the battery 60, the controller 50 closes all of the neutral point switching elements 23 and the first charging switch 31 and opens the second charging switch 32 and the direct charging switch 33. The controller 50 opens all of the switching elements of the sub-inverter 80, and opens the upper and lower switching elements 12, 13 of the W-phase series connection 11*w* of the inverter 10. The controller 50 turns on and off the lower switching elements 13 of the U-phase and V-phase series connections 11*u*, 11*v* as appropriate. The voltage of the external power supply 90 is boosted by series connection of the stator coils 21*w*, 21*u* and series connection of the stator coils 21*w*, 21*v*. At this time, the charging system 202 can charge the battery 60 while reducing AC loss, like the charging system 2 of the first embodiment.

As described above, the charging systems 2, 102, and 202 can increase the inductance in the boost circuit that uses the stator coils 21.

Features and points to note of the charging systems of the embodiments will be described. For better understanding, the one end of the stator coil will be referred to as "end A" and the other end of the stator coil will be referred to as "end B" in the following description. The ends A of the stator coils 21 are connected to the AC ends of the inverter 10, and the ends B of the stator coils 21 are connected to the neutral point 22.

The charging system 2 (102, 202) of the embodiment includes the three stator coils 21*u*, 21*v*, and 21*w*. The motor of the charging system disclosed in the present disclosure may include any number of stator coils as long as it is two or more. The number of stator coils is not limited to three. The motor of the charging system includes N stator coils ($N>1$). The inverter includes N series connections and N AC ends. The N AC ends are connected to the ends A of the N stator coils.

The first charging switch 31, 131 connects the end A of at least one of the stator coils to the power receiving positive end 40*p*. The first charging switch 31 of the charging system 2 (202) connects the end A of one stator coil 21*w* out of the three stator coils 21*u*, 21*v*, and 21*w* to the power receiving positive end 40*p*. The first charging switch 131 of the charging system 102 connects the ends A of two stator coils 21*w*, 21*v* out of the three stator coils 21*u*, 21*v*, and 21*w* to the power receiving positive end 40*p*. The charging system need only include a charging switch that connects the ends A of M stator coils ($1 \le M < N$) out of the N stator coils to the power receiving positive end 40*p*.

The inverter 10 includes N series connections 11 connected in parallel between the DC positive end 10*p* and the DC negative end 10*n*. Each of the N series connections 11 includes series connection of the upper switching element 12 and the lower switching element 13. The upper switching elements 12 are connected to the DC positive end 10*p*, and the lower switching elements 13 are connected to the DC negative end 10*n*. The midpoints of the N series connections (i.e., the midpoints between the upper and lower switching elements 12, 13) are the AC ends of the inverter 10.

When boosting the output voltage of the external power supply 90 to charge the battery 60, the controller 50 performs the following process. The controller 50 closes the first charging switch 31 (131). For convenience of description, the stator coil connected to the first charging switch 31 (131) will be referred to as "upstream stator coil", and the remainder of the stator coils will be referred to as "downstream stator coil". In the boost circuit using the stator coils 21 and the lower switching elements 13, the upstream stator coil and the downstream stator coil are connected in series.

The controller 50 opens the upper and lower switching elements 12, 13 connected to the end A of the upstream stator coil, and turns on and off the lower switching element 13 connected to the end A of the downstream stator coil. The stator coils and the lower switching elements function as a boost circuit, so that the voltage of the external power supply 90 is boosted. The battery 60 is charged with the boosted power from the external power supply 90. At this time, the total inductance of the boost circuit is large because the upstream stator coil and the downstream stator coil are connected in series.

The charging system 2 includes the cooler 26 that cools the motor 20 with a liquid cooling medium. In this case, $N \ge 3$ and $M=1$. The first charging switch connects the ends A of the M stator coils to the power receiving positive end 40*p*. The motor 20 is disposed such that the shaft of the motor 20 extends in the horizontal direction. The stator coil connected to the first charging switch (upstream stator coil) is located below the other stator coils (downstream stator coils) in the vertical direction. The upstream stator coil is at least partially immersed in the liquid cooling medium. The current flowing through the upstream stator coil is larger than the current flowing through each downstream stator coil. Therefore, the amount of heat generation of the upstream stator coil is larger than the amount of heat generation of each downstream stator coil. However, with the above configuration, the upstream stator coil is cooled more strongly than the downstream stator coils.

The charging system 2 (102, 202) includes the direct charging switch 33 that connects the power receiving positive end 40*p* to the battery positive end 60*p* by bypassing the stator coils 21. When the output voltage of the external power supply 90 is equal to the output voltage of the battery 60, the controller 50 opens the first charging switch 31 (131) and the second charging switch 32 and closes the direct charging switch 33. With this configuration, the battery 60 can be charged by the external power supply 90 without through the stator coils.

Other points to note of the technique described in the embodiments will be described. The charging system 2 (102, 202) of the embodiment provides the above advantages even without the second charging switch 32.

The charging system 2 (102, 202) can drive the motor 30 by the inverter 10. Therefore, the charging system 2 (102, 202) may be referred to as "drive charging system".

The expression "switching element is closed" means that devices connected to both ends of the switching element are electrically connected to each other. The expression "switching element is opened" means that devices connected to both ends of the switching element are electrically disconnected from each other. The expression "switching element is closed" is equivalent to the expression "switching element is turned on". The expression "switching element is opened" is equivalent to the expression "switching element is turned off".

Although specific examples of the present disclosure are described in detail above, these are only illustrative, and are not intended to limit the scope of the claims. The technique described in the claims includes various modifications and alterations of the specific examples illustrated above. The technical elements illustrated in the present specification or the drawings exhibit technical utility alone or in various combinations, and are not limited to the combinations set forth in the claims as originally filed. The technique illustrated in the present specification or the drawings may achieve a plurality of objects at the same time, and has technical utility by achieving one of the objects.

What is claimed is:

1. A charging system that boosts a voltage of a power supply to charge a battery, the charging system comprising:

an inverter including a direct current positive end, a direct current negative end, and a plurality of alternating current ends, the direct current positive end and the direct current negative end being connected to the battery;

a motor including N stator coils each having a first end connected to a corresponding one of the alternating current ends and a second end connected to a neutral point, wherein N is the number of stator coils;

a power receiving terminal including a power receiving positive end and a power receiving negative end that are configured to be connected to the power supply, the power receiving negative end being connected to a battery negative end of the battery;

a first charging switch configured to connect the first end of each of one or more and less than N of the stator coils to the power receiving positive end; and a second charging switch configured to connect the power receiving positive end to the neutral point.

2. The charging system according to claim 1, further comprising a cooler configured to cool the stator coils with a liquid cooling medium, wherein:

the first charging switch is configured to connect the first end of one of the stator coils to the power receiving positive end; and the stator coil connected to the first charging switch is located below a remainder of the stator coils in a vertical direction.

3. The charging system according to claim 1, further comprising a direct charging switch configured to connect the power receiving positive end to a battery positive end by bypassing the stator coils.

4. The charging system according to claim 1, further comprising a sub-inverter whose direct current ends are connected to the battery and whose alternating current ends are connected to the second ends of the stator coils.

5. The charging system according to claim 1, wherein the first charging switch is configured to directly connect the first end of each of one or more and less than N of the stator coils to the power receiving positive end.

6. The charging system according to claim 1, wherein the first charging switch and the second charging switch are connected to the power receiving positive end through a shared node.

* * * * *